United States Patent Office 3,291,559
Patented Dec. 13, 1966

3,291,559
PROCESS OF BLEACHING CELLULOSE WITH CHLORINE DIOXIDE WHEREIN CHLORINE DIOXIDE IS CONTINUOUSLY REPLENISHED
Homer L. Robson, New Haven, Conn., and John F. Synan, Baltimore, Md., assignors to Olin Mathieson Chemical Corporation, a corporation of Virginia
No Drawing. Filed Oct. 13, 1961, Ser. No. 145,003
3 Claims. (Cl. 8—108)

This invention relates to an improved process for bleaching cellulosic textiles using aqueous chlorine dioxide solution as the bleaching agent and forcing the bleaching solution to flow through a plurality of layers of cellulosic textile.

Cellulosic textiles have previously been bleached with chlorine dioxide in aqueous solution and commercially the bleaching of wood pulp with aqueous chlorine dioxide solutions is a well developed art. However, none of the prior art suggestions for bleaching cellulosic textiles with aqueous chlorine dioxide solutions have been found feasible commercially principally because strong solutions of chlorine dioxide in water are hazardous to prepare and use. Such strong solutions have a high vapor pressure of chlorine dioxide above the solution which contaminates the atmosphere of the bleachery and presents explosion hazards as well as health hazards to operators. Dilute solutions of chlorine dioxide, above which the vapor pressure of chlorine dioxide gas is within tolerable limits can be used to bleach small proportions of cellulosic textiles immersed therein, for example, on a laboratory scale. However, for the bleaching of cellulosic textiles in quantities of several hundred pounds to several tons, the volume of such dilute solutions becomes fantastically large and the process is not commercially operable.

Greige cotton cloth, after desizing, can be bleached by immersing in a cold solution of chlorine dioxide and allowing it to stand for 24 or more hours. If sufficient chlorine dioxide is originally present in the solution and the solution has adequate access to the cloth, it is bleached. In such a "cold soak" process it is essential to have sufficient chlorine dioxide in the solution to bleach the cloth effectively. When, for example, it has been found by suitable tests that 1 percent chlorine dioxide on the dry weight of the cloth is sufficient to effect the desired bleaching, the cloth is impregnated with a 1 percent chlorine dioxide solution and nipped to leave 100 percent pick-up. It is then simply stacked in a tub or other container for a day or so while the bleaching takes place. If, however, the cloth as delivered to the bleaching step is already moist, a strong solution of chlorine dioxide is required. The desized and washed cloth is nipped to reduce the water content to about 60 percent of the dry weight of the cloth, passed through a 2.5 percent chlorine dioxide solution and nipped to a pick-up of 100 percent solution on the weight of the dry cloth. The chlorine dioxide solution is required to be 2.5 percent in order to provide 1 percent chlorine dioxide on the wet cloth at 100 percent pick-up.

Concentrated aqueous solutions of chlorine dioxide of the order of one percent of chlorine dioxide (10,000 parts per million) can safely be prepared and used provided they are refrigerated, rapidly diluted to safer concentrations or promptly mixed with a material to be bleached or otherwise reacted with chlorine dioxide to reduce the concentration rapidly to safe levels. Thus handled, such solutions can be safely utilized in closed systems which avoid exposure of these concentrated solutions to the atmosphere. Chlorine dioxide is cheaper than sodium chlorite per unit of bleaching power, especially when generated from chlorates and used as an aqueous solution. For this reason, chlorine dioxide solutions are extensively used in pulp bleaching.

Such strong solutions of chlorine dioxide cannot be used in the open in a textile mill. A 1 percent solution of chlorine dioxide provides one-sixth of an atmosphere pressure of chlorine dioxide gas at 75° F., and such concentrations of chlorine dioxide are hazardous as a source of explosion. For health reasons only a few parts per million of chlorine dioxide can be permitted in air. It is not feasible to operate with such strong solutions around a textile mill, unless the solutions are wholly enclosed and thus cannot pollute the air.

Closed textile treating machines are available and in use in the art for bleaching and dyeing. In some of these machines, the textile is wound on a tubular, perforated beam or shaft. A bleaching solution is pumped through the beam and through the laminae of textile wound thereon. Alternatively, the bleaching solution is withdrawn from the beam after passing from the enclosing tank through the textile to be treated. Although these machines have long been known and extensively installed in plants designed for dyeing and finishing of cellulosic textiles, the feasibility of bleaching cellulosic textiles in these machines with aqueous chlorine dioxide solutions has apparently not been suggested. These bleaching solutions are readily and cheaply prepared and produce excellent whites with a minimum degradation of the strength of the cellulosic textile. It is surprising that the art has not thought of this admirable method of bleaching in machines which are eminently suitable and in which bleaching with aqueous chlorine dioxide solutions is so conveniently accomplished.

Bleaching with aqueous chlorine dioxide solutions in package dyeing machines is, however, not a matter of simple substitution of this bleachant for the dyes conventionally used in these machines. Because of the peculiar properties of chlorine dioxide, substantial modifications of conventional operations were required to provide an operative process of bleaching with chlorine dioxide in these machines.

The process of the present invention comprises, as one of its features, forcing an aqueous solution of chlorine dioxide to flow through a plurality of layers of the textile. In a particularly preferred embodiment of the invention, the aqueous chlorine dioxide solution is pumped into beam on which the textile is laminally wound, through perforations in the beam and through the cloth wound on the beam.

Alternatively the beam wound with cloth is immersed in aqueous chlorine dioxide solution and, by applying reduced pressure to the beam, the solution is forced to flow into and through the textile and into the beam through perforations therein. Appropriately the beam wound with cloth is immersed or enclosed in a closed tank and the chlorine dioxide solution is pumped into the perforated beam forcing the solution through the laminae of the textile into the enclosing tank. Advantageously the pump draws the solution from the tank and returns it to the perforated beam, continuously circulating the aqueous chlorine dioxide solution through the cloth. When the bleaching solution is thus continuously pumped through the cloth, strong chlorine dioxide solution is introduced into the suction of the pump, together with the recycle liquor, to maintain the chlorine dioxide concentration in the aqueous solution and to replace the chlorine dioxide consumed in the process of bleaching. The beam may also be wound with yarn or non-woven ("laid") fabrics of cellulose and similarly bleached.

Not all of the machines known to the bleaching art are equally suitable for the process of the present invention. It is preferred to utilize machines in which the ratio of bleach liquor to cloth is as low as possible in order to obtain effective bleaching with a feasible quantity of liquor. Appropriately the total liquor to cloth ratio does not exceed about 10:1 by weight and preferably is from about 5:1 to 10:1 by weight with respect to the cloth. For this reason package dyeing machines which are arranged so that much of the space is not occupied by the beam or cloth are less suitable. They must be filled with liquor to cover the cloth and excessive quantities are required. Machines having a large liquor storage capacity compared to the weight of cloth which can be contained therein are not as suitable since they require the introduction and maintenance of excessive volumes of strong chlorine dioxide solution. In contrast, kiers which can be loaded nearly full of folded lengths of textiles can be used in the practice of the process of this invention. Burlington machines are especially well adapted to the practice of this invention. In some Burlington machines, the perforated beam is 36 inches in diameter on which the cloth is wound to a depth of 10 to 12 inches. Other machines have smaller beams, such as 18 inches and are wound with a thickness of two feet of cloth. Each beam wound with cloth is enclosed in a separate container and fills a major proportion of the volume of the container. While the cloth is thus immersed in the liquor, no great bulk of unused liquor is stored in the machine. The ratio of cloth to liquor in the filled machine is usually from about 5:1 to 10:1. Such machines with a low liquor to cloth ratio give a sharp indication of completion of the bleaching process of the present invention as the chlorine dioxide content of the tank liquor rises sharply in the limited volume of liquor.

In the practice of the process of the present invention in Burlington machines, the beam wound with cloth is loaded in and the machine is filled with water or aqueous solution, which may contain wetting agents, buffers and/or other adjuncts and the machine is closed. The treating solution is pumped into the beam and through perforations therein into the cloth and collected in a closed tank. During passage through the cloth, the bleaching solution is depleted according to the amount of bleaching done by the solution. A given cloth which is bleached by 1 percent of its weight of chlorine dioxide, theoretically requires slowly passing through the cloth a weight of liquor equal to the weight of the cloth and containing 1 percent of chlodine dioxide. The rate must be so slow that all of the chlorine dioxide is utilized in one passage of the solution through the cloth. This procedure is quite impractical as well as dangerous, especially at temperatures of 70° to 210° F. Passing a solution originally carrying 100 parts per million of chlorine dioxide through the cloth 100 times exposes the cloth to as much chlorine dioxide and the same degree of bleaching is obtained, when the chlorine dioxide is completely utilized. For example, pumping a solution carrying 40 parts per million chlorine dioxide through 1000 pounds of cloth on the beam at 160° F. at a rate of 250 gallons per minute for 120 minutes exposes the cloth to sufficient chlorine dioxide to effect excellent bleaching.

To maintain the chlorine dioxide content of the bleach solution pumped from the enclosing tank to the beam, a mixing T is placed downstream from the outlet of the regular pump which circulates liquor from the tank to the beam inlet. A strong aqueous solution of chlorine dioxide is pumped into the mixing T by a proportioning pump. For example, 2 gallons per minute of a 2000 parts per million chlorine dioxide stock solution is added to 100 gallons per minute of solution circulated from the tank through the beam inlet and thus through the cloth. The amount of bleaching liquor circulated through the cloth varies with the design of the machine and the cloth to be bleached. Up to 1000 gallons per minute is pumped to a beam 36 inches in diameter wound with cloth in an open or folded width to a depth of 10 to 12 inches. In other machines, for example, with a beam 18 inches in diameter wound with cloth to a depth of two feet require only about 100 to 300 gallons per minute of circulating liquor.

Operating at 160° F. it is preferable to pump sufficient of the strong solution, containing 4000 to 10,000 parts per million of chlorine dioxide, to bring the solution to about 40 parts per million as it enters the beam. During passage through the cloth, the content of chlorine dioxide falls substantially and the concentration of chlorine dioxide in the solution in the closed tank may be as low as 10 parts per million after the first hour. When the content of chlorine dioxide in the solution in the tank reaches 20 parts per million the supply of strong chlorine dioxide solution cloth varies with the design of te machine and the cloth is stopped while continuing to circulate the solution from the tank to the beam. If this recirculation results in a rapid drop in the chlorine dioxide content of the tank liquor, addition of strong solution is started again and continued until the tank liquor again reaches 20 parts per million of chlorine dioxide. When the solution in the tank shows only a slow drop in chlorine dioxide content after the supply of fresh solution has been cut off, the bleaching is deemed to be complete. Operating at higher temperatures, such as 190–210° F., the same procedure is followed, except that the solution in the tank is preferably allowed to rise only to 5 or most 10 parts per million while strong solution is being added. These operations are eminently safe because the rate of circulation is high and the high concentration of chlorine dioxide in the incoming liquor is rapidly reduced until near the end of the bleaching process.

During the pumping operation, the direction of flow of the bleaching liquor through the cloth is advantageously reversed at intervals to promote uniform bleaching, first pumping liquor into the beam, so that it passes outward into the tank holding the beam and then drawing from the beam, so that the liquor in the tank passes into the cloth, through it and out through the beam to the pump. In the process of the present invention the strong solution of chlorine dioxide being metered into the circulating stream of bleach liquor has an objectionable vapor pressure of chlorine dioxide if not promptly diluted, it is thus preferable to pump the bleach liquid unidirectionally into the beam while addition of strong chlorine dioxide liquor is being made. After the liquor in the tank has shown an appreciable residual and the addition of strong liquor has been discontinued, the usual practice of reversing the flow at intervals is suitable.

The bleaching solution in the machine may advantageously also contain buffers, wetting agents or other adjuncts. Suitable wetting agents include the Igepons, salts of acylalkyltaurides and expecially Igepon T, salts of higher acyl derivatives, particularly the oleyl derivatives of lower alkyltaurides. Suitable buffers include the borates, the alkali metal phosphates and buffers of the sodium acetate-acetic acid type. In the present process, the pH may range from about 2 to 8 but maintaining a pH of about 5 to 6 is particularly advantageous. Under these conditions, corrosion problems are largely avoided, particularly in the vapor phase where gaseous chlorine dioxide causes serious corrosion.

The chlorine dioxide content of the bleaching liquor can be determined in any convenient known manner. Electrophotometrically, the color is matched against standards as a measure of chlorine dioxide content. This may also be measured by titrating a sample of the liquor, to which acetic acid and potassium iodide have been added, with standard sodium thiosulfate solution, preferably not stronger than 0.1 normal.

After completion of the bleaching operation, the liquor in the machine is usually sewered since the amount of chlorine dioxide therein is negligible and there is no problem of fume release in the sewer. Advantageously, after dumping the liquor, a small amount of wash water may be pumped through the beam to avoid any chlorine dioxide contamination of the atmosphere when the machine is opened and the bleached cloth is removed. The process of our invention operates with no release of any objectionable fumes of chlorine dioxide in the air of the bleach plant. The process of our invention is particularly suitable for small batches of delicate fabrics where only a few thousand yards may be wound on the beam or folded into the kier and treated as a separate batch. Many fabrics including those of delicate weave, men's suiting, wash-and-wear fabrics, wrinkleable materials and other textiles which would be damaged by treatment in rope form or by fast passage through impregnating rollers are safely handled on beam machines and are safely and thoroughly bleached in beam machines. The whites obtained by the present invention are "full whites" and are comparable with the same cloth bleached by conventional acid chlorite processes. The cloth is frequently whiter than the same cloth treated by chlorite bleaching activated by other means, for example, where the activator is an organic substance and the bleaching takes place under mildly acidic conditions such as pH 5.5 to 6.5.

The term "cellulosic textiles" in this specification and in the claims is intended to include cotton goods of all kinds including cotton, linen, jute, hemp and other textile fibers consisting essentially of cellulose as well as cellulose regenerated from a viscose solution. Also included and successfully bleached by the process of the present invention are blended textiles, for example, blends of cotton and nylon, cotton and synthetic polyester fibers, cotton and polyacrylonitrile fibers and other blends containing even minor proportions of cellulosic fiber. Although the description is directed primarily to cotton it is to be understood that the term "cellulosic textiles" in the specification and claims of the present application includes both the cellulosic fibers and blends thereof with synthetic fibers, woven or non-woven yarns or fabrics.

EXAMPLE I

A Burlington machine was charged with a beam wound with 1,000 yards of 80 x 120 greige cotton cloth which had previously been desized. The wound beam was placed in position in the Burlington machine which was then closed. The machine was filled by pumping in 750 gallons of water at the rate of 250 gallons per minute. During a period of three minutes, while the complete contents were recycled, 7.5 gallons of a 1 percent solution of chlorine dioxide in water was proportioned into the discharge of the main pump thus forming the bleaching solution with an average content of 100 parts per million of chlorine dioxide. Maintaining the temperature at 160° F., the chlorine dioxide solution was circulated from the Burlington machine tank through the pump to the beam and through the cloth for a period of 120 minutes. During the 10 minutes from 100 to 110 minutes of the operation, a 1 percent chlorine dioxide solution was metered into the pump in sufficient quantities to maintain the concentration of chlorine dioxide in the tank liquor at about 20 parts per million. At the end of 110 minutes of operation, the supply of concentrated chlorine dioxide solution was cut off and the chlorine dioxide content of the liquor in the tank dropped to only 18 parts per million at 120 minutes, when the bleaching appeared to be complete. The liquor was pumped to the sewer and replaced by fresh water which was circulated through the cloth for five minutes and then discarded. The machine was opened and the beam and textile were removed. No odor of chlorine dioxide was noticed and the textile was homogeneously bleached to an excellent white.

EXAMPLE II

A Burlington machine was charged with a beam wound with 1,000 yards of 80 x 120 greige cotton cloth which had previously been desized. The wound beam was placed in position in the Burlington machine which was then closed. The machine was filled by pumping in 750 gallons of water at the rate of 250 gallons per minute. While the complete contents were recycled at the same pumping rate, 1 gallon per minute of a 1 percent solution of chlorine dioxide in water was proportioned into the discharge of the main pump thus forming a bleaching solution going to the beam of 40 parts per million of chlorine dioxide. Maintaining the temperature at 160° F., the chlorine dioxide solution was circulated from the Burlington machine tank through the pump to the beam and through the cloth for a period of 90 minutes. The addition of the 1 percent chlorine dioxide solution was stopped but the circulation of the solution in the machine was continued for an additional 30 minutes. The chlorine dioxide content of the solution was almost constant during the last 20 minutes. The liquor was pumped to the sewer and replaced by fresh water which was circulated through the cloth for five minutes and then discarded. The machine was opened and the beam and textile were removed. No odor of chlorine dioxide was noticed and the textile was homogeneously bleached to an excellent white.

EXAMPLE III

A Burlington machine was charged with a beam wound with 1,000 yards of 80 x 120 greige cotton cloth which had previously been desized. The wound beam was placed in position in the Burlington machine which was then closed. The machine was filled by pumping in 750 gallons of water at the rate of 250 gallons per minute. While the complete contents were recycled at the same pumping rate, 2.5 gallons per minute of a 1 percent aqueous solution of chlorine dioxide was metered into the discharge of the main pump for a period of 5 minutes. During the 6th through the 10th minute, 2 gallons per minute of the 1 percent chlorine dioxide solution was metered in. From the 11th to the 20th minute, 1.5 gallons per minute of the 1 percent chlorine dioxide solution was introduced. From the 21st to the 30th minute, the 1 percent chlorine dioxide solution was introduced at the rate of 1 gallon per minute. Beginning at the 21st minute, the direction of flow of the bleaching solution was reversed every 3 minutes to even out the bleaching and the aqueous chlorine dioxide was introduced while the liquor flowed into the cloth. After the 60th minute the chlorine dioxide concentration in the liquor levelled out at about 16 parts per million. The liquor was pumped out and the bleached cloth was washed with water and removed from the machine.

EXAMPLE IV

The Burlington machine was charged as described in Example I and the direction of flow of the aqueous liquor was reversed every 2.5 minutes. One percent aqueous chlorine dioxide was introduced into the circulating liquor while the flow was into the beam, according to the following schedule:

2.5 gallons per minute for one-half of 10 minutes;
2.0 gallons per minute for one-half of 5 minutes;
1.5 gallons per minute for one-half of 10 minutes;
1.0 gallon per minute for one-half of 35 minutes.

At the end of 60 minutes the introduction of the 1 percent aqueous chlorine dioxide solution was discontinued. Circulation was continued for 20 minutes and then the bleached cloth was washed and removed from the machine.

EXAMPLE V

A percolator type closed kier was loaded with 3 tons of 80 x 100 thread count broadcloth (running 3.65 yards per pound) folded into the kier in 48 x 60 inch folds. The broadcloth filled about 80 percent of the volume of the kier. The kier was closed and filled with an aqueous solution containing 0.5 gram per liter of monosodium-disodium phosphate buffer to maintain the pH at about 6.5 and 0.3 percent of Polytergent B–350, a polyoxyethelated nonylphenol wetting agent. The solution was drawn from the top of the kier and returned to the bottom of the kier where it passed over closed steam coils to maintain the temperature at about 160° F. The treating solution was then forced to flow upwardly through the folded layers of the broadcloth. A 1 percent aqueous chlorine dioxide solution was metered into the pump discharge to provide 120 parts per million of chlorine dioxide in the solution delivered to the kier. After about 75 minutes, the chlorine dioxide content of the liquor effluent from the kier, which had been at 5 to 10 parts per million, began to rise sharply and the introduction of the 1 percent solution was discontinued. After an additional 30 minutes of circulation, the chlorine dioxide content of the effluent had levelled off at 15 parts per million of chlorine dioxide. The liquor was pumped out of the kier and replaced by circulating wash water. After 30 minutes of washing, the broadcloth was removed from the kier and dried. An excellent bleach was obtained.

Ordinarily the machines described above are fitted with an equalizer acting as a surge tank to accommodate fluctuation in flow. The equalizers are usually open to the atmosphere. For this reason it is preferable, in order to avoid any chance of introducing objectionable amounts of chlorine dioxide into the atmosphere, to limit the introduction of the concentrated chlorine dioxide solution to the circulating bleach liquor to maintain not to exceed about 200 parts per million of chlorine dioxide in the bleach solution circulated to the textile. As the bleaching proceeds, this limit is preferably reduced to maintain only a small residue in the bleach liquor leaving the cloth. This avoids any possibility of objectionable amounts of chlorine dioxide in the air of the bleach room. When the bleaching process approaches completion, it is appropriate to reduce materially the concentration of chlorine dioxide in the bleach liquor flowing to the textile to as low as about 10 parts per million. This is controlled more accurately when the concentrated chlorine dioxide solution introduced into the circulating bleach liquor is likewise reduced to about 500 parts per million or even less.

What is claimed is:

1. Process of bleaching cellulosic textiles in a closed system comprising forcing a bleach liquor comprising an aqueous solution of chlorine dioxide to flow cyclically from a closed supply of the bleach liquor through a plurality of layers of the cellulosic textiles and back to the closed supply of the bleach liquor while proportionately introducing into the circulating bleach liquor a concentrated aqueous solution containing about 500 to 10,000 parts per million of chlorine dioxide to maintain from 10 to 200 parts per million of chlorine dioxide in the bleach liquor circulated to the textile.

2. Process according to claim 1 in which the cellulosic textile is in the form of a laminally wound strip immersed in the closed supply of the bleach liquor.

3. Process according to claim 1 in which the temperature of the bleach liquor is about 70° to 210° F.

References Cited by the Examiner
UNITED STATES PATENTS

| 2,338,268 | 1/1944 | Stossel et al. | |
| 2,479,605 | 8/1949 | Denyes | 8—108.5 |
| 2,654,793 | 10/1953 | Orthner | 8—108 X |

OTHER REFERENCES

Chem. Abs., vol. 50, p. 571*i* January-February 1956; abstracting Swedish Patent 151,174 of Aug. 16, 1955.

Chem. Abs., vol. 52, p. 7685*f*, May-June 1958.

NORMAN G. TORCHIN, *Primary Examiner.*

MORRIS O. WOLK, *Examiner.*

E. SZOKE, J. CANNON, *Assistant Examiners.*